United States Patent [19]

Arlt et al.

[11] 4,276,193
[45] Jun. 30, 1981

[54] CATALYST ON A SOLID CARRIER FOR THE POLYMERIZATION OF α-OLEFINS

[75] Inventors: Klaus-Peter Arlt; Ulrich Grigo; Rudolf Binsack, all of Krefeld, Fed. Rep. of Germany

[73] Assignee: Bayer Aktiengesellschaft, Fed. Rep. of Germany

[21] Appl. No.: 72,085

[22] Filed: Sep. 4, 1979

[30] Foreign Application Priority Data

Sep. 8, 1978 [DE] Fed. Rep. of Germany ....... 2839136

[51] Int. Cl.³ .............................................. C08F 4/64
[52] U.S. Cl. ................................ 252/429 B; 526/125
[58] Field of Search ..................................... 252/429 B

[56] References Cited

U.S. PATENT DOCUMENTS 4,069,169  1/1978  Toydda et al. .................. 252/429 B
4,186,107  1/1980  Wagner .......................... 252/429 B

*Primary Examiner*—Patrick Garvin
*Attorney, Agent, or Firm*—Connolly and Hutz

[57] ABSTRACT

A process for the preparation of a stereospecific α-olefin polymerization catalyst which comprises (i) forming a solid carrier from an anhydrous magnesium compound and an electron donor compound; (ii) contacting the solid carrier obtained in step (i) with a solution of TiCl$_4$ in an inert solvent; and (iii) reducing the TiCl$_4$ with a reducing agent of the formula $$AlR_nX_{3-n}$$

wherein R is an alkyl group having from 1 to 18 carbon atoms, X is a halogen atom, and n is an integer such that $0 < n \leq 3$.

7 Claims, No Drawings

CATALYST ON A SOLID CARRIER FOR THE POLYMERIZATION OF α-OLEFINS

The present invention relates to a process for the preparation of a catalyst component of the Ziegler-Natta type applied to a carrier based on magnesium compounds to a catalyst so prepared, and to its use in the preparation of highly stereo regular polymers of α-olefins.

Numerous examples of catalysts having a high specific activity (measured in g polymer/g Ti.h.atm) and a high stereo specificity (measured in % solubility in boiling n-heptane) in the polymerisation of α-olefins have been described, e.g. in German Offenlegungsschriften Nos. 2,643,143; 2,636,193, and U.S. Pat. No. 4,069,169.

The catalysts described in German Offenlegungsschrift No. 2,643,143 are generally prepared by first subjecting anhydrous $MgCl_2$ and ethyl benzoate to a process of grinding for ca. 100 hours and then, in a second stage, treating the product of this grinding with an excess of $TiCl_4$ at 90° to 135° C. In a third stage, the solid complex thus obtained is reduced with an aluminium-alkylene compound in the presence of esters and in a subsequent stage, before the addition of propylene thereto, it is contacted with esters and optionally an aluminium-alkylene compound in a reaction autoclave.

The specific activity of the catalyst prepared in the above way is approximately 8000 to 9000 g polymer/g Ti.h.atm and the average degree of isotacticity is 92 to 94%. Attempts to improve the degree of isotacticity by adding more electron donor compounds leads to a reduction in the catalytic activity.

In German Offenlegungsschrift No. 2,636,193 there is described a process of polymerisation using a catalyst system based on a titanium halide/ester complex on $MgCl_2$ and a complex of a trialkylaluminium compound with a carboxylic acid ester, which process is characterised in that the organoaluminium component also contains the reaction product of a dialkylmagnesium compound with a monoalkylaluminium halide compound.

The catalysts used in this particular process have a specific activity of 8000 to 10,000 g polymer/g Ti.h.atm and the degree of isotacticity is in the region of 94 to 95%.

The process of preparation of catalyst described in U.S. Pat. No. 4,069,169 is a two-stage process which is characterized in that in a first stage, magnesium chloride is contacted with monocyclic carboxylic acid esters by mechanical pulverisation and in a second stage, the component prepared in the first stage is contacted with a titanium compound. Although a second electron donor treatment is no longer necessary in this process, the long time required for grinding the components, and the low average degree of isotacticity of 91 to 92% at a sufficient catalytic activity are disadvantages.

It has now surprisingly been found that the stereo specificity of the catalyst can be improved and the preparation time substantially shortened if the magnesium compound such as magnesium dihalide, which has generally been stirred up with electron donor compound is subjected to a treatment with $TiCl_4$ carried out with a dilute solution of $TiCl_4$ in an inert solvent. Other treatment steps designed to increase the stereo specificity of the catalyst may then be dispensed with.

The present invention, therefore, provides a process for the preparation of a stereospecific α-olefin polymerisation catalyst which comprises:

(i) forming a solid carrier from an anhydrous magnesium compound and an electron donor compound;

(ii) contacting the solid carrier obtained in step (i) with a solution of $TiCl_4$ in an inert solvent; and (iii) reducing the $TiCl_4$ with a reducing agent of the formula:

$$AlR_nX_{3-n}$$

wherein R is an alkyl group having from 1 to 18 carbon atoms, X is a halogen atom, and n is an integer such that $0 < n \leq 3$.

In the process according to the present invention, the $TiCl_4$ treatment of the adduct formed from the magnesium compound contacted with electron donor is not carried out with an excess of pure $TiCl_4$ at 135° C., but is carried out with a quantity of $TiCl_4$ which is calculated to be less than equivalent to the electron donor in an inert solvent at a temperature of from 30° to 130° C., preferably from 50° to 90° C. This method ensures that after the $TiCl_4$ treatment, the finished carrier catalyst still contains free electron donor in addition to the electron donor contained in the $TiCl_4$-electron donor complex which is important for the stereo specificity.

Ordinary commercial anhydrous magnesium dihalides are suitable as solid carriers for the process of the present invention, although other anhydrous magnesium compounds may be used. It is advantageous to use anhydrous $MgCl_2$ which has been precipitated with anhydrous HCl from are suitable as solid carriers for the process of the present invention. It is advantageous to use $MgCl_2$ which has been precipitated with anhydrous HCl from diethylether Grignard solutions at a temperature of $-5°$ C. to $+5°$ C. and which has a specific surface area of ca. 20 $m^2/g$. $MgCl_2$ which has been obtained by precipitation with anhydrous HCl at a temperature from $-5°$ C. to $+5°$ C. from a Grignard solution diluted with toluene or chloroform in a volumetric ratio in the range of from 3:1 to 7:1 and which has a specific surface area of ca. 60 $m^2/g$ is particularly advantageous. The Grignard solutions may be prepared from any of the usual alkyl halides employed for these reactions.

Particularly suitable electron donor compounds are organic compounds which contain atoms having free electron pairs, such as oxygen, sulphur, nitrogen or phosphorus.

Examples of such electron donors include ethers, thio-ethers, tertiary amines and phosphines, aldehydes, ketones, arsines, stibines and esters. Particularly suitable are the esters of aromatic carboxylic acids, e.g. methyl benzoate and ethyl benzoate, or the esters of alkyl and alkoxy benzoic acids, e.g. methyl-p-toluate, ethyl-p-toluate, i-propyl-p-toluate, n- and i-amyltoluate, phenyl-p-toluate, n-butyl-p-toluate or methylanisate, ethylanisate, i-propyl-anisate, i-butylanisate, phenylanisate, benzylanisate, methyl-p-ethoxybenzoate and methyl-o-ethoxybenzoate.

The electron donors are stirred up with $MgCl_2$ in a molar ratio of $MgCl_2$/electron donor = 2:1 to 12:1 at room temperature over a period of 1 to 3 hours. It is advantageous to use an $MgCl_2$/electron donor ratio in the range of 3:1 to 8:1 and particularly advantageous to use an $MgCl_2$/electron donor ratio in the range of 4:1 to 6:1. These ratios are also applicable to other Mg-compounds.

Suitable inert solvents for the procedure according to the present invention of contacting the mixture of electron donor and $MgCl_2$ with a solution of $TiCl_4$ include aliphatic linear and branched chain as well as cycloaliphatic hydrocarbons having from 5 to 18 atoms, for example, n-hexane, n-heptane, cyclohexane and isooctane. Inert solvents containing halogen atoms, such as $CCl_4$ and $SiCl_4$ are also suitable. $SiCl_4$ is particularly suitable. The molar ratio of $TiCl_4$ to electron donor may be in the range of from 1:10 to 1:30, preferably of from 1:15 to 1:25 and a ratio in the range of from 1:18 to 1:22 is is particularly preferred.

Suitable compounds for use as reducing agents are organic aluminium compounds corresponding to the general formula: $Al\ R_n\ X_{3-n}$, wherein R is a $C_1-C_{18}$-alkyl group, X is a halogen atom, preferably chlorine, and n is an integer such that $0 < n \leq 3$. Diethylaluminium chloride is particularly suitable.

Reduction is generally performed at temperatures in the range of from 50° C. to 100° C., preferably of from 60° to 80° C., in a diluent which is inert towards the reactants. Suitable diluents include aliphatic and cycloaliphatic hydrocarbons having from 5 to 18 carbon atoms. Isooctane is particularly suitable. The solid component is preferably introduced into the reaction vessel as a 4–6% by wt. suspension in isooctane and the reducing agent is added with stirring, preferably using an Al/Ti ratio of from 50 to 100:1. The components are contacted for a reasonable period of time at an elevated temperature. The treatment is advantageously carried out at 60° C. for 10 to 20 minutes.

The suspension of catalytic complex obtained is suitable for the stereospecific polymerisation of α-olefins corresponding to the formula $CH_2=CHR$ wherein R is a hydrogen atom or a $C_1-C_{12}$ alkyl group. Suitable α-olefins include, for example, ethylene, propylene, 1-butene, 1-pentene, 1-hexene, 1-undecene, 4-methyl-1-pentene and mixtures thereof. The system described is particularly suitable for obtaining high yields of polypropylene with a higher isotacticity than can be obtained by the known art.

The conditions for the polymerisation of α-olefins are already known. Polymerisation temperatures of from 20° to 100° C. are employed, preferably from 40° to 80° C., at partial pressures of the monomers of 1 bar or higher. Polymerisation may be carried out in the presence or absence of an inert hydrocarbon and in the gaseous phase. It is advantageous to use the solvents mentioned above for the reductions. Further alkyl aluminium compounds may be added in the course of polymerisation. This measure generally increases the catalytic activity by 20 to 30%. Particularly suitable as additional activitators are organic aluminium compounds which do not contain halogen atoms, e.g. triethylaluminium, triisopropylaluminium and tri-n-butylaluminium. Triethylaluminium is particularly advantageous and may be added in a respective molar ratio of Ti/Al in the range of from 1:50 to 1:200. This measure also increases the catalytic activity but not at the expense of the isotacticity as in generally observed in Ziegler-Natta catalyst systems. The specific yield may be further increased by the addition of hydrogen which at the same time lowers the molecular weight or increases the melt index.

The present invention is further illustrated with the aid of the following Examples in which all the percentages are based on weight.

PREPARATION OF THE SOLID CARRIER

Method I 36.47 g (1.5 mol) of magnesium filings is introduced into 150 ml of anhydrous diethylether in a 250 ml flask at reflux temperature and 132 ml (1.5 mol) of n-propyl chloride in 300 ml of anhydrous diethylether are subsequently added dropwise. After completion of the reaction, undissolved magnesium is removed by filtration through glass wool. 1200 ml of toluene is added to the filtrate and anhydrous HCl gas is then introduced after the filtrate has been cooled to 0° C. When precipitation is complete, the reaction mixture is filtered and washed 5 times with isooctane at room temperature. All the above procedures are carried out under argon. The residue obtained is dried in a vacuum at 80° C. The specific surface area determined by the modified BET method of F. M. Nelson and F. T. Eggertsen [Analyt. Chem. 30, page 1387 (1958)] is found to be 70 $m^2/g$ and the yield is 120.7 g.

METHOD II

The procedure is the same as in Method I but without the addition of toluene as diluent. The product yield is 115 g and its specific surface area is found to be 20 $m^2/g$.

EXAMPLE 1

Preparation of Catalyst Component 7.98 g (0.083 mol) of $MgCl_2$ prepared by Method I is stirred up with 2.52 g (0.018 mol) of ethylbenzoate for 5 hours at room temperature under an argon atmosphere. The $MgCl_2$ stirred up with the ester is treated for 2 hours at 70° C. with a solution of 0.16 g (0.84 mMol) of $TiCl_4$ in 148.3 g (0.872 mol) $SiCl_4$ and then filtered at this temperature and subsequently washed twice with 100 ml of isooctane at 80° to 90° C. The residue consisting of 9.9 g of white powder is dried in vacuo at 80° C.

Results of analysis: 0.29% Ti; 53.4% Cl; 18.60% Mg and 27.1% ester. The specific surface area is 55 $m^2/g$.

POLYMERISATION OF PROPYLENE IN ISOOCTANE 1.31 g of the solid catalyst component obtained in Example 1 and containing 0.0038 g Ti is stirred up with 0.7 ml of diethylaluminum chloride in 50 ml of isooctane for 15 minutes at 60° C. 800 ml of isooctane are introduced into a 2-liter glass autoclave containing argon. After addition of the suspension of catalytic complex, 0.8 ml (10.9 mMol) of triethylaluminium are added. When the polymerisation temperature of 70° C. has been reached, polymerisation is carried out for one hour at a propylene pressure of 4 bar said pressure being kept constant by the continuous introduction of fresh propylene under pressure. At the end of the reaction, unreacted propylene is blown off, and the polymer suspension is treated with an excess of a methanol/-butanol mixture.

After filtration and drying at 100° C., there is obtained 90 g of polypropylene (=PP) containing 99.4% of a component which is insoluble in boiling n-heptane and 99.9% of a component which is insoluble in boiling diethylether. This corresponds to a specific yield of 5,900 g PP/g Ti.h.atm.

EXAMPLE 2

The catalyst is prepared in the same way as in Example 1 except that $MgCl_2$ prepared by Method II is used as the solid carrier. Analysis of the specific surface area gives a value of 18 m²/g and the analytical values for the elements are the same as those given in Example 1.

Polymerisation is carried out with 1.4 g of catalyst and with the same molar ratios of Al/Ti as in Example 1. 50 g of PP containing 99.1% of a component which is insoluble in boiling n-heptane is obtained. The specific yield for this catalyst is therefore 3,200 g PP/g Ti.h.atm.

EXAMPLE 3

The procedure is the same as in Example 1 except that both in the stages of reduction and of reactivation, triethyl aluminium is used in the molar ratios indicated in Example 1.

Polymerisation is carried out with 1.4 g of solid catalyst component. 65 g of PP containing 90% of a component which is insoluble in boiling n-heptane is obtained. This corresponds to a specific activity of 4,200 g PP/g Ti.h.atm.

We claim:

1. A process for preparing a stereospecific α-olefin polymerization catalyst, said process consisting of the steps of (a) forming a solid carrier of anhydrous magnesium dihalide;

(b) mixing said carrier with an electron donor compound;

(c) contacting the mixture of (b) with a solution of TiCl₄ in SiCl₄, the molar ratio of TiCl₄ to electron donor being from 1:10 to 1:30 and (d) reducing the TiCl₄ with a reducing agent of the formula $$AlR_nX_{3-n}$$

wherein R is alkyl having 1 to 18 carbon atoms, X is halogen and n is an integer such that $0<n\leq 3$.

2. A process as claimed in claim 1, wherein the electron donor compound is an ether, a thioether, a tertiary amine, a phosphine, an aldehyde, a ketone, an arsine, a stibine or an ester.

3. A process as claimed in claim 2, wherein the electron donor compound is an ester of an aromatic carboxylic acid, an alkylbenzoic acid or an alkoxybenzoic acid.

4. A process as claimed in claim 3, wherein the electron donor compound is methyl benzoate, ethyl benzoate, methyl-p-toluate, ethyl-p-toluate, i-propyl-p-toluate, n-amyl toluate, i-amyl toluate, phenyl-p-toluate, n-butyl-p-toluate, methylenisate, ethylanisate, i-propylanisate, i-butylanisate, phenylanisate, benzylanisate, methyl-p-ethoxybenzoate or methyl-o-ethoxybenzoate.

5. A process as claimed in claim 1, wherein step (b) is performed by stirring up the electron donor compound with the anhydrous magnesium compound in a respective molar ratio of from 2:1 to 12:1 at room temperature over a period of from 1 to 3 hours.

6. A process as claimed in claim 1, wherein X is a chlorine atom.

7. A process as claimed in claim 1, wherein the reducing agent is diethylaluminium chloride.

* * * * *